(12) United States Patent
Lee et al.

(10) Patent No.: US 11,202,063 B2
(45) Date of Patent: Dec. 14, 2021

(54) METHOD AND DEVICE FOR ENCODING/DECODING IMAGE, AND RECORDING MEDIUM STORING BIT STREAM

(71) Applicant: Electronics and Telecommunications Research Institute, Daejeon (KR)

(72) Inventors: Jin Ho Lee, Daejeon (KR); Hyun Suk Ko, Daejeon (KR); Jung Won Kang, Daejeon (KR); Sung Chang Lim, Daejeon (KR); Ha Hyun Lee, Seoul (KR); Dong San Jun, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 5 days.

(21) Appl. No.: 16/336,219

(22) PCT Filed: Sep. 22, 2017

(86) PCT No.: PCT/KR2017/010469
§ 371 (c)(1),
(2) Date: Mar. 25, 2019

(87) PCT Pub. No.: WO2018/066849
PCT Pub. Date: Apr. 12, 2018

(65) Prior Publication Data
US 2019/0215512 A1    Jul. 11, 2019

(30) Foreign Application Priority Data
Oct. 4, 2016 (KR) .................. 10-2016-0127874

(51) Int. Cl.
*H04N 19/105* (2014.01)
*H04N 19/176* (2014.01)
(Continued)

(52) U.S. Cl.
CPC .......... *H04N 19/105* (2014.11); *H04N 19/11* (2014.11); *H04N 19/117* (2014.11);
(Continued)

(58) Field of Classification Search
CPC .... H04N 19/105; H04N 19/176; H04N 19/11; H04N 19/119; H04N 19/186
(Continued)

(56) References Cited

U.S. PATENT DOCUMENTS

2013/0177068 A1*   7/2013   Minoo ................. H04N 19/192
                                                         375/240.02
2016/0198189 A1    7/2016   Lee et al.
(Continued)

FOREIGN PATENT DOCUMENTS

JP    2013-141187 A    7/2013
JP    2013-150164 A    8/2013
(Continued)

OTHER PUBLICATIONS

International Search Report dated Jan. 18, 2019 in Corresponding International Application No. PCT/KR2017/010469 (4 pages in English).

*Primary Examiner* — On S Mung
(74) *Attorney, Agent, or Firm* — NSIP Law

(57) ABSTRACT

An image encoding/decoding method and apparatus for predicting a second color component block using a first color component block are provided. An image decoding method of the present invention comprises deriving a pre-
(Continued)

diction parameter using the first color component block, and predicting the second color component block using the derived prediction parameter.

11 Claims, 9 Drawing Sheets

(51) Int. Cl.
| | |
|---|---|
| *H04N 19/11* | (2014.01) |
| *H04N 19/119* | (2014.01) |
| *H04N 19/186* | (2014.01) |
| *H04N 19/80* | (2014.01) |
| *H04N 19/91* | (2014.01) |
| *H04N 19/593* | (2014.01) |
| *H04N 19/117* | (2014.01) |
| *H04N 19/51* | (2014.01) |
| *H04N 19/159* | (2014.01) |
| *H04N 19/70* | (2014.01) |
| *H04N 19/96* | (2014.01) |
| *H04N 19/172* | (2014.01) |

(52) U.S. Cl.
CPC ......... *H04N 19/119* (2014.11); *H04N 19/159* (2014.11); *H04N 19/172* (2014.11); *H04N 19/176* (2014.11); *H04N 19/186* (2014.11); *H04N 19/51* (2014.11); *H04N 19/593* (2014.11); *H04N 19/70* (2014.11); *H04N 19/80* (2014.11); *H04N 19/91* (2014.11); *H04N 19/96* (2014.11)

(58) Field of Classification Search
USPC ..................................................... 375/240.02
See application file for complete search history.

(56) References Cited

U.S. PATENT DOCUMENTS

| | | | |
|---|---|---|---|
| 2016/0255362 A1 | 9/2016 | Kim et al. | |
| 2017/0272757 A1* | 9/2017 | Xu | ........................ H04N 19/593 |
| 2019/0200011 A1* | 6/2019 | Yoo | ........................ H04N 19/11 |

FOREIGN PATENT DOCUMENTS

| | | |
|---|---|---|
| JP | 2015-008341 A | 1/2015 |
| KR | 10-2012-0061035 A | 6/2012 |
| KR | 10-2013-0004133 A | 1/2013 |
| KR | 10-2014-0029525 A | 3/2014 |
| KR | 10-2015-0139933 A | 12/2015 |
| KR | 10-2016-0032124 A | 3/2016 |
| KR | 10-2016-0078493 A | 7/2016 |
| WO | WO 2014/163200 A1 | 9/2014 |
| WO | WO 2015/009732 A1 | 1/2015 |
| WO | WO 2015/066525 A1 | 5/2015 |

* cited by examiner (a)          (b)

(a) first color component block (b) restructured first color component block (a)

(b)

(c)

(d)

(e)

(a)

(b)

(c)

(d)

ical solutwx
METHOD AND DEVICE FOR ENCODING/DECODING IMAGE, AND RECORDING MEDIUM STORING BIT STREAM

CROSS REFERENCE TO RELATED APPLICATIONS

This application is a U.S. National Stage Application of International Application No. PCT/KR2017/010469, filed on Sep. 22, 2017, which claims the benefit under 35 USC 119(a) and 365(b) of Korean Patent Application No. 10-2016-0127874, filed on Oct. 4, 2016, in the Korean Intellectual Property Office.

TECHNICAL FIELD

The present invention relates to a method and apparatus for encoding/decoding an image and a recording medium storing a bitstream. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency.

Another object of the present invention is to provide a method and apparatus for encoding and decoding an image using intra prediction to enhance compression efficiency.

Another object of the present invention is to provide a recording medium storing a bitstream generated by an image encoding method/apparatus of the present invention.

Technical Solution

An image decoding method of predicting a second color component block using a first color component block according to the present invention may comprise deriving a prediction parameter using the first color component block, and predicting the second color component block using the derived prediction parameter.

In the image decoding method of the present invention, the first color component block may be a luma block and the second color component block may be a chroma block.

The image decoding method of the present invention may further comprise determining whether or not to perform the predicting of the second color component block using the first color component block, based on a size or a shape of the second color component block.

The image decoding method of the present invention may further comprise restructuring the first color component block, based on a size of the first color component block and a size of the second color component block.

In the image decoding method of the present invention, when the first color component block has a larger size than that of the second color component block, the restructuring of the first color component block may comprise down-sampling the first color component block.

In the image decoding method of the present invention, when the first color component block has a size smaller than that of the second color component block, the restructuring of the first color component block may comprise up-sampling the first color component block.

In the image decoding method of the present invention, the restructuring of the first color component block may be performed based on whether a boundary of the first color component block or a boundary of the second color component block is a boundary of a predetermined image region or not.

In the image decoding method of the present invention, the predetermined image region may be at least any one of a picture, a slice, a tile, a CTU, and a CU.

In the image decoding method of the present invention, when the boundary of the first color component block or the boundary of the second color component block is the boundary of the predetermined image region, the number of upper reference sample lines and the number of left reference sample lines, which are used for the restructuring of the first color component block, may differ.

In the image decoding method of the present invention, a reference sample used for the restructuring of the first color component block may be determined based on an intra prediction mode of the first color component block.

In the image decoding method of the present invention, a reference sample used for the restructuring of the first color component block may be determined based on a quantization parameter of a neighbor block of the first color component block.

In the image decoding method of the present invention, wherein when the first color component block has a square shape and the second color component block has an oblong shape, a reference sample used for the restructuring of the first color component block may be a reference sample disposed around the square-shaped first color component block.

In the image decoding method of the present invention, the deriving of the prediction parameter may be performed by using at least any one of a reference sample of the first color component block and a reference sample of the second color component block.

In the image decoding method of the present invention, the reference sample used in the deriving of the prediction parameter may be determined based on an intra prediction mode of the first color component block.

In the image decoding method of the present invention, the reference sample used in the deriving of the prediction parameter may be determined based on a size or a shape of the first color component block or the second color component block.

In the image decoding method of the present invention, the deriving of the prediction parameter may be performed based on at least any one of a correlation, a change, an average value, and a distribution between the reference sample of the first color component block and the reference sample of the second color component block.

An image decoding apparatus according to the present invention may comprise an intra prediction unit that predicts a second color component block using a first color component block. The intra prediction unit may perform deriving a prediction parameter using the first color component block, and predicting the second color component block using the derived prediction parameter.

An image encoding method of predicting a second color component block using a first color component block according to the present invention may comprise deriving a prediction parameter using the first color component block, and predicting the second color component block using the derived prediction parameter.

An image encoding apparatus according to the present invention may comprise an intra prediction unit that predicts a second color component block using a first color component block. The intra prediction unit may perform deriving a prediction parameter using the first color component block, and predicting the second color component block using the derived prediction parameter.

A recording medium according to the present invention may store a bitstream generated by an image encoding method according to the present invention.

Advantageous Effects

According to the present invention, a method and apparatus for encoding and decoding an image to enhance compression efficiency may be provided.

According to the present invention, a method and apparatus for encoding and decoding an image using intra prediction to enhance compression efficiency may be provided.

According to the present invention, a recording medium storing a bitstream generated by an image encoding method/apparatus of the present invention may be provided.

MODE FOR CARRYING OUT THE INVENTION

Figure 1:
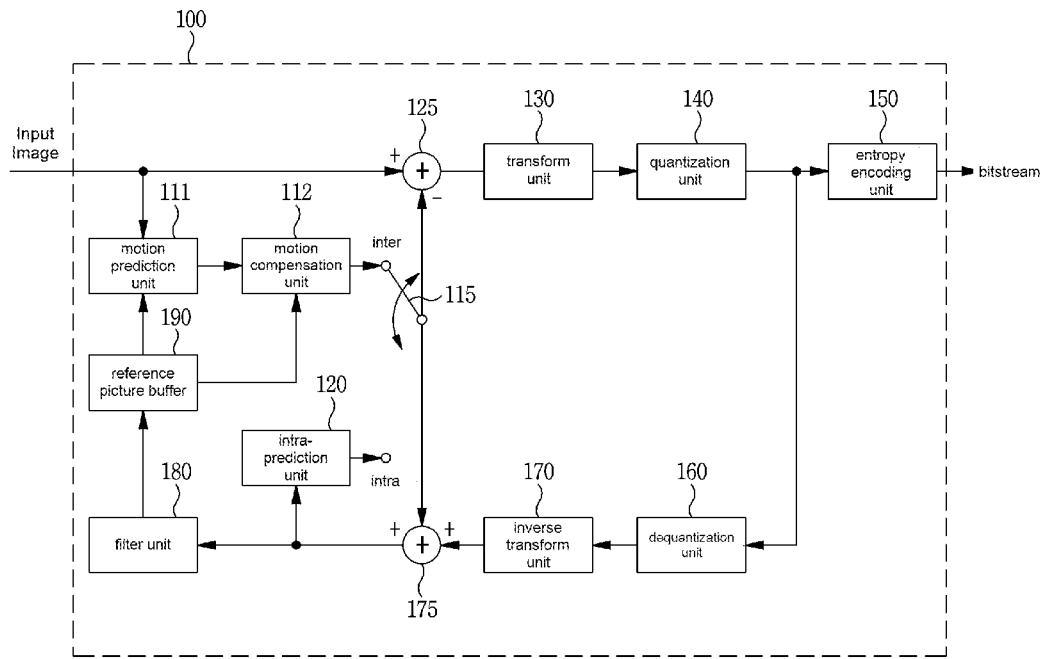
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.
Decoder: means an apparatus performing decoding
Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Transform Unit: means a basic unit when performing encoding/decoding such as transform, reverse-transform, quantization, dequantization, transform coefficient encoding/decoding of a residual signal. A single transform unit may be partitioned into a plurality of transform units having a small size.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a reverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a block size, a block depth, block partition information, a unit size, a unit depth, unit partition information, a partition flag of a quad-tree form, a partition flag of a binary-tree form, a partition angle of a binary-tree form, an intra-prediction mode, an intra-prediction angle, a reference sample filtering method, a prediction block boundary filtering method, a filter tap, a filter coefficient, an inter-prediction mode, motion information, a motion vector, a reference image index, a inter-prediction angle, an inter-prediction indicator, a reference image list, a motion vector predictor, a motion vector candidate list, whether or not a motion merge mode is used, a motion merge candidate, a motion merge candidate list, whether or not a skip mode is used, an interpolation filter type, a motion vector size, a presentation accuracy of a motion vector, a transform type, a transform size, information of whether or not an additional (secondary) transform is used, information of whether or not a residual signal is present, a coded block pattern, a coded block flag(CBF), a quantization parameter, a quantization matrix, in-loop filter information, information of whether or not an in-loop filter is applied, an in-loop filter coefficient, binarization/reverse-binarization method, a context model, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be reverse-transformed in the reverse-transform unit 170. A dequantized or reverse-transformed coefficient or both may be added with a prediction block by the adder 175. By adding the dequantized or reverse-transformed coefficient or both with the prediction block, a reconstructed block may be generated. Herein, the dequantized or reverse-transformed coefficient or both may mean a coefficient on which at least one of dequantization and reverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
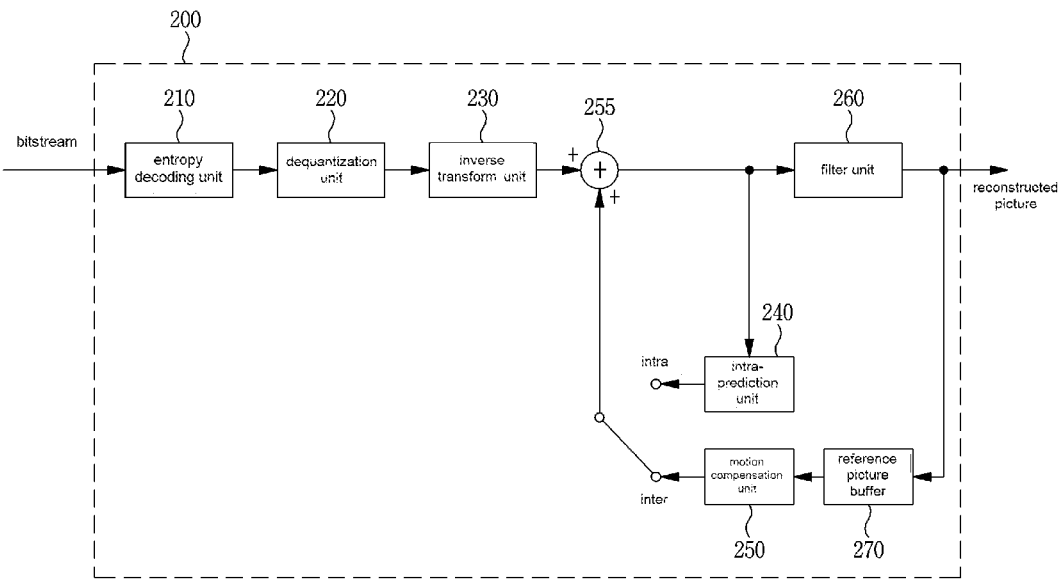
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a reverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a reverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or reverse-transformed in the reverse-transform unit 230. The quantized level may be a result of dequantizing or reverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded.

When an inter mode is used, the motion compensation unit 250 may generate a prediction block by performing motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
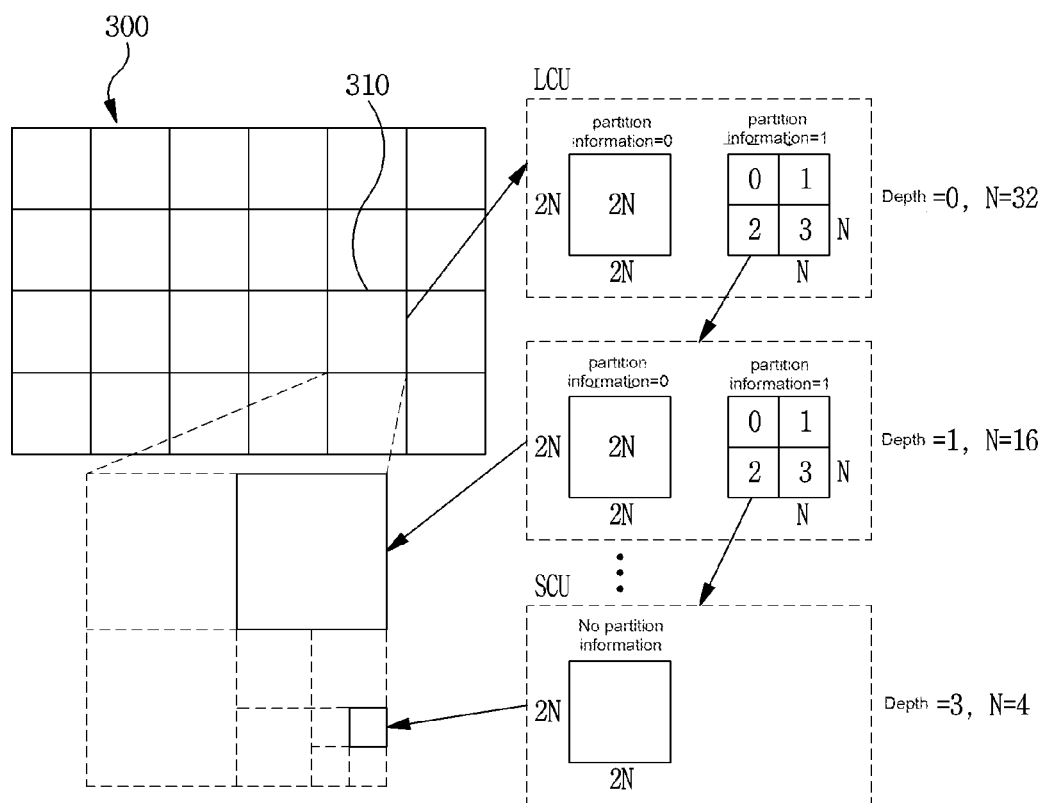
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, reverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
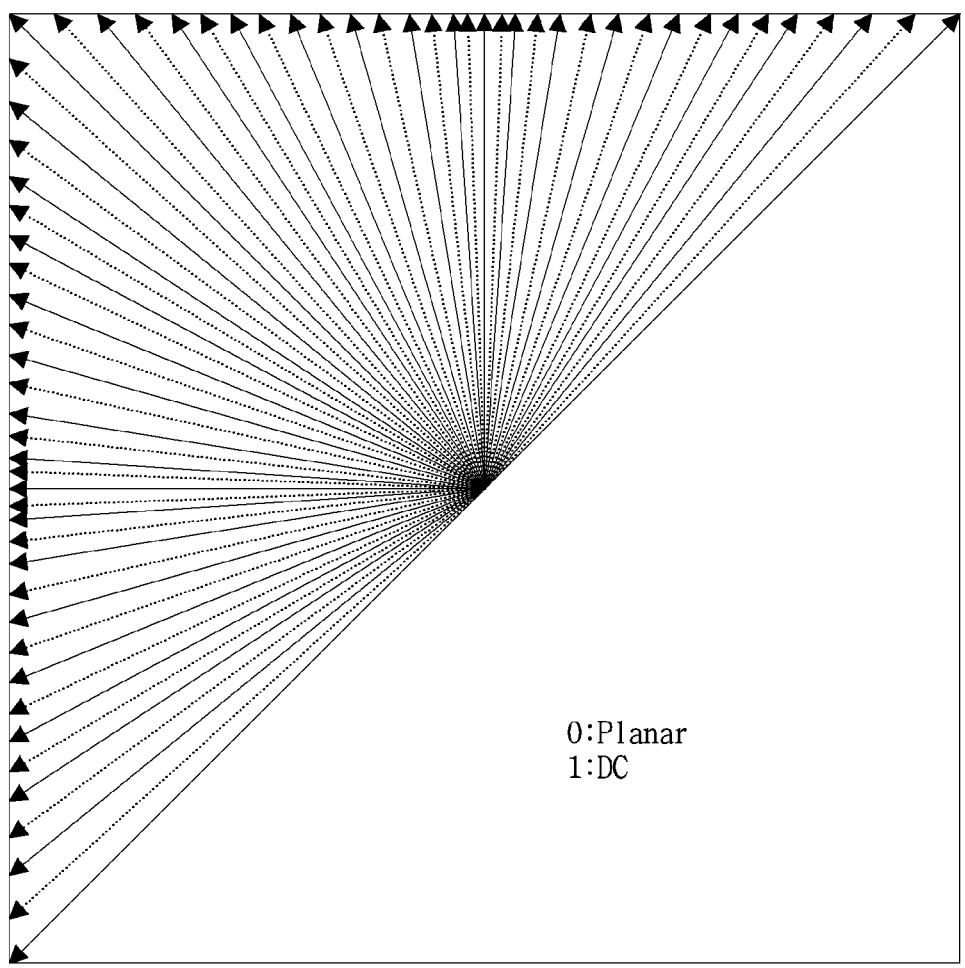
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M including the non-angular and the angular modes, M being equal to or greater than 1.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
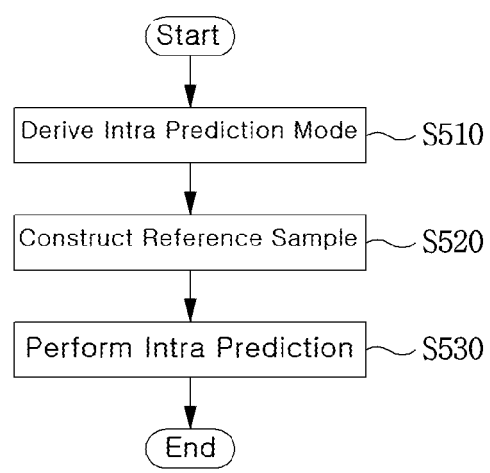
FIG. 5 is a view for explaining intra prediction according to the present invention.

FIG. 5 is a view showing intra-prediction according to the present invention.

Intra-prediction of a current block may include: step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream, a method of using a coding parameter of a neighbor block or a method of using intra prediction mode of a color component. According to the method of using the intra-prediction mode of the neighbor block, the intra-prediction mode of the current block may be derived by using at least one intra-prediction mode derived by using an intra-prediction mode of a neighbor block, a combination of at least one intra-prediction mode of a neighbor block, and at least one MPM.

In step S520, a reference sample may be configured by performing at least one of reference sample selecting and reference sample filtering.

In step S530, intra-prediction may be performed by performing at least one of non-angular prediction, angular prediction, positional information based prediction, and inter color component prediction. When angular prediction is performed, prediction having angles different by a predetermined unit that includes at least one sample of the current block may be performed. The predetermined unit may be, for example, at least one of a singular sample, a sample group, a line, and a block. The inter color component prediction may comprise restructuring of a color component block, deriving a prediction parameter and/or performing inter color component prediction. In step S530, filtering on a prediction sample may be additionally performed.

In order to derive the intra-prediction mode of the current block, at least one reconstructed neighbor block may be used. A position of the reconstructed neighbor block may be a fixed position that is predefined, or may be a position derived by encoding/decoding. Hereinafter, encoding/decoding may mean entropy encoding and decoding. For example, when a coordinate of a left upper corner side sample of a current block having a W×H size is (0, 0), a neighbor block may be at least one of blocks adjacent to coordinate of (−1, H−1), (W−1, −1), (W, −1), (−1, H), and (−1, −1), and neighbor blocks of the above blocks. Here, W and H may represent length or the number of samples of width (W) and height (H) of the current block.

An intra-prediction mode of a neighbor block which is not available may be replaced with a predetermined intra-prediction mode. The predetermined intra-prediction mode may be, for example, a DC mode, a planar mode, a vertical mode, a horizontal mode, and/or a diagonal mode. For example, when a neighbor block is positioned outside of a boundary of at least one predetermined unit of a picture, a slice, a tile, and a coding tree unit, the neighbor block is inter-predicted, or when the neighbor block is encoded in a PCM mode, the corresponding block may be determined as non-available. Alternatively, when the neighbor block is unavailable, the intra prediction mode of the corresponding block is not replaced and not used.

The intra-prediction mode of the current block may be derived as a statistical value of an intra-prediction mode of a predetermined positional neighbor block or an intra-prediction mode of at least two neighbor blocks. In the present description, the statistical value may mean at least one of an average value, a maximum value, a minimum value, a mode, a median value, a weighted average value, and an interpolation value.

Alternatively, the intra-prediction mode of the current block may be derived based on a size of neighbor blocks. For example, an intra-prediction mode of a neighbor block having relatively large size may be derived as the intra-prediction mode of the current block. Alternatively, a statistical value may be calculated by assigning a large weight on an intra-prediction mode of a block having relatively large size.

Alternatively, whether or not the intra-prediction mode of the neighbor block is angular mode may be considered. For example, when the intra-prediction mode of the neighbor block is a non-angular mode, the non-angular mode may be derived as the intra-prediction mode of the current block. Alternatively, an intra-prediction mode of other neighbor block, except for the non-angular mode, may be derived as the intra-prediction mode of the current block.

In order to derive the intra-prediction mode of the current block, one or more most probable mode (MPM) lists may be configured by using an intra-prediction mode of a neighbor block. A number N of candidate modes included in an MPM list may be fixed, or may be determined according to a size or form or both of the current block. The MPM list may be configured not to include an overlapped mode. When a number of available candidate modes is smaller than N, a predetermined candidate mode among available candidate modes, for example, a mode obtained by adding or subtracting a predetermined offset to an angular mode may be added to the one or more MPM lists. Alternatively, at least one of a horizontal mode, a vertical mode, a 45 angular mode, a 135 angular mode, a 225 angular mode, and a non-angular mode may be added to the MPM list. The predetermined offset may be 1, 2, 3, 4, or a positive integer.

The MPM list may be configured in a predetermined sequence based on a position of the neighbor block. For example, the predetermined sequence may be a sequence of blocks adjacent to a left side, an upper side, a left lower corner side, a right upper corner side, and a left upper corner side of the current block. A non-angular mode may be included in the MPM list at an arbitrary position. For example, it may be added next to intra-prediction modes of blocks adjacent to a left side and an upper side.

As another embodiment, the intra-prediction mode of the current block may be derived by using an intra-prediction mode derived by using an MPM list and an intra-prediction mode of a neighbor block. For example, when the intra-prediction mode derived by using the MPM list is Pred_mpm, the Pred_mpm may be changed by using the intra-prediction mode of the neighbor block. For example, when Pred_mpm is larger than the intra-prediction mode of the neighbor block (or larger than a statistical value of at least two intra-prediction modes), Pred_mpm may be increased by n, otherwise, Pred_mpm may be decreased by n. Herein, n may be a predetermined integer such as +1, +2, +3, 0, −1, −2, −3, etc. The intra-prediction mode of the current block may be derived as the changed Pred_mpm. Alternatively, when at least one of Pred_mpm and intra-prediction modes of the neighbor block is a non-angular mode, the intra-prediction mode of the current block may be derived as the non-angular mode. Alternatively, the intra-prediction mode of the current block may be derived as an angular mode.

According to a further embodiment of the present invention relating to a method of deriving an intra prediction mode, an intra prediction mode of a current block may be derived by using an intra prediction mode of a different color component. For example, when the current block is a chroma block, an intra prediction mode of a luma block corresponding to the chroma block can be used to derive an intra prediction mode of the chroma block. As the luma block corresponding to the chroma block, there may be one or more luma blocks. The corresponding luma block may be determined depending on at least any one of the size, the shape, and the encoding parameter of a chroma block. Alternatively, the corresponding luma block may be determined depending on at least any one of the size, the shape, and the encoding parameter of a luma block.

The luma block corresponding to the chroma block may be composed of a plurality of partitions. All or part of the plurality of partitions may have different intra prediction modes thereof. An intra prediction mode of the chroma block may be derived on the basis of all or part of the plurality of partitions included in the corresponding luma block. In this case, some partitions may be selectively used, in which the used partitions are selected based on the comparison of the block size, the shape, the depth information, etc. of the chroma block with those of the luma block (all or part of the plurality of partitions). A partition at a position in the luma block corresponding to a predetermined position in the chroma block may be selectively used. The predetermined position may refer to a corner sample (e.g., upper left sample) position in the chroma block or a center sample position in the chroma block.

The method of deriving an intra prediction mode of one color component block using an intra prediction mode of a different color component block (i.e. inter color component intra prediction mode) according to the present invention is not limited to the example in which an intra prediction mode of a luma block corresponding to a chroma block is used. For example, an intra prediction mode of a chroma block may be derived by using or sharing at least any one of an MPM index mpm_idx and an MPM list of a luma block corresponding to the chroma block.

Figure 6:
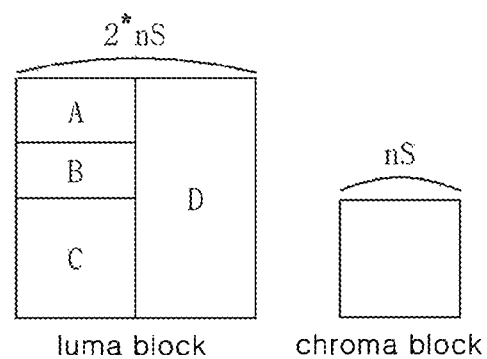
FIG. 6 is an exemplary diagram illustrating the relationship between a luma block and a chroma block.

FIG. 6 is an exemplary diagram illustrating the relationship between a luma block and a chroma block.

In the example illustrated in FIG. 6, a sample ratio of color components is 4:2:0, and at least one of luma blocks A, B, C, and D corresponds to one chroma block.

With reference to FIG. 6, an intra prediction mode of one chroma block may be derived by using an intra prediction mode of the luma block A corresponding to a sample at an upper left position (0,0) in the chroma block or an intra prediction mode of the luma block D corresponding to a sample at a center position (ns/2, ns/2) in the chroma block. The predetermined position in the chroma block is not limited to the upper left position (0, 0) or the center position (nS/2, nS/2). For example, The predetermined position may be an upper right position, a lower left position, and/or a lower right position.

The predetermined position may be selected on the basis of the shape of the chroma block. For example, with the chroma block having a square shape, the predetermined position may be a center sample position. With the chroma block having an oblong shape, the predetermined position may be an upper left sample position. Alternatively, the predetermined position may be a position of an upper left sample in the chroma block having a square shape or a position of a center sample in the chroma block having an oblong shape.

According to a further embodiment, an intra prediction mode of a chroma block may be derived by using statistic figures of one or more intra prediction modes of a luma block having an equal size to the chroma block.

In the example illustrated in FIG. 6, a mode corresponding to the average of the intra prediction modes of the luma blocks A and D or a mode corresponding to the average of the intra prediction modes of the luma blocks A, B, C, and D having an equal size to the chroma block is derived as the intra prediction mode of the chroma block.

When there are multiple intra prediction modes of available luma blocks, all or part of them may be selected. The selection is performed based on the predetermined position in the chroma block or based on the size(s), the shape(s), and/or the depth(s) of the chroma block, the luma block, or both. The intra prediction mode of the chroma block can be derived by using the selected intra prediction mode of the luma block.

For example, the size of the luma block A corresponding to the upper left sample position (0,0) in the chroma block and the size of the luminance bock D corresponding to the center sample position (nS/2, nS/2) in the chroma block are compared, and the intra prediction mode of the luma block D having a larger size may be used to derive the intra prediction mode of the chroma block.

Alternatively, when the size of a luma block corresponding to a predetermined position in a chroma block is equal to or larger than the size of the chroma block, an intra prediction mode of the chroma block is derived by using the intra prediction module of the luma block.

Alternatively, when the size of a chroma block is within a predetermined range, an intra prediction mode of the chroma block is derived by using an intra prediction mode of a luma block corresponding to the upper left sample position (0, 0) in the chroma block.

Alternatively, when the size of a chroma block is within a predetermined range, the size of a luma block corresponding to a predetermined position (0, 0) of the chroma block and the size of a luma block disposed at another predetermined position (nS/2, nS/2) of the chroma block are compared, and an intra prediction mode of the chroma block is derived by using the intra prediction mode of the luma block having a larger size.

The predetermined range may be derived from at least any one piece of information among information signaled through a bitstream, information of the size (and/or depth) of a block (a chroma block, a luma block, or both), and information predefined in an encoder or a decoder.

Alternatively, when a chroma block has an oblong shape, an intra prediction mode of the chroma block may be derived by using an intra prediction mode of a luma block corresponding to a center sample position (ns/2, ns2) in the chroma block.

Among the plurality of partitions of the luma block, a partition having the same shape as the chroma block may be used. For example, when the chroma block has a square shape or a non-square shape, a partition having a square shape or a non-square shape, selected among the plurality of partitions of the luma block, may be used.

In the example described with reference to FIG. 6, the method of deriving an intra prediction mode of a chroma block using an intra prediction mode of a luma block also applies to a case in which an intra prediction mode of a luma block is used as an intra prediction mode of a chroma block as it is. The method of deriving an intra prediction mode of a chroma block is not limited to the method of using an intra prediction mode of the corresponding luma block. For example, an intra prediction mode of a chroma block can be derived from information, including an MPM list and an MPM index mpm_idx, which is used to derive an intra prediction mode of a luma block.

Alternatively, the MPM list of the chroma block can be constructed using the intra prediction mode of the luma block corresponding to the sample of the predetermined position in the chroma block. In this case, the mpm-idx information of the chroma block may be encoded and signaled. The MPM list of the chroma block may be constructed in a similar way to the construction of the MPM list of the luma block. MPM candidates of the chroma block may include intra prediction modes of neighbor chroma blocks and/or intra prediction modes of luma blocks corresponding to the chroma block.

When an MPM flag is 0, a second MPM list including at least one intra-prediction mode may be configured, and the intra-prediction mode of the current block may be derived by using a second MPM index (2nd_mpm_idx). Herein, a second indicator (for example, a second MPM flag) indicating whether or not the intra-prediction mode of the current block is included in the second MPM list may be encoded/decoded. Similar to a first MPM list, the second MPM list may be configured by using intra-prediction modes of the neighbor block. Herein, the intra-prediction mode included in the first MPM list may not be included in the second MPM list. A number of MPM lists is not limited to 1 or 2, N MPM lists may be used.

When the intra-prediction mode of the current block is not included in one of a plurality of MPM lists, a luma component intra-prediction mode of the current block may be encoded/decoded. In addition, a chroma component intra-prediction mode may be derived and encoded/decoded based on an associated luma component intra-prediction mode.

When the current block is partitioned into a plurality of sub-blocks, in order to derive an intra-prediction mode of each sub-block, at least one of the described methods may be applied.

A size or form or both of a sub-block may be a predetermined size or block or both (for example, 4×4), or may be determined according to a size or form or both of the current block. Alternatively, the size of the sub-block may be determined based on whether or not a neighbor block of the current block is partitioned, or may be determined based on an intra-prediction mode of a neighbor block of the current block. For example, the current block may be partitioned based on a boundary at which an intra-prediction mode of a neighbor block is different. Alternatively, the current block may be partitioned based on whether the neighbor block is an intra coding block or an inter coding block.

An indicator (for example, NDIP_flag) representing that the intra-prediction mode of the current block is derived by using the intra-prediction mode of the neighbor block may be encoded/decoded. The indicator may be encoded/decoded by at least one unit of the current block and the sub-block. Herein, when a size of the current block or the sub-block corresponds to a predetermined size or a predetermined size range, the indicator may be encoded/decoded.

Determining whether or not the size of the current block corresponds to a predetermined size may be performed based on a horizontal or vertical length of the current block. For example, when the horizontal or vertical length is a length capable of being partitioned, it is determined that the size of the current block corresponds to a predetermined size.

When the current block is partitioned into a plurality of sub-blocks, an intra-prediction mode of the plurality of sub-blocks may be derived in a zig-zag sequence, or may be derived in parallel. An intra-prediction mode of the sub-block may be derived by at least one of methods of deriving the intra-prediction mode of the current block. Herein, the neighbor block of the current block may be used as a neighbor block of each sub-block. Alternatively, the sub-block within the current block may be used as a neighbor block of each sub-block.

An intra-prediction mode of a sub-block included in a current block may be derived by using an average value of an intra-prediction mode of the current block and an intra-prediction mode of a block adjacent to a left and upper side of a sample positioned at (0, 0) of each sub-block. For example, when an intra-prediction mode of a current block is larger than the above average value, the half of the above average value may be subtracted from the derived intra-prediction mode. When the intra-prediction mode of the current block is equal to or less than the above average value, the half of the above average value may be added to the derived intra-prediction.

Intra-prediction information of may be signaled through at least one of a video parameter set (VPS), a sequence parameter set (SPS), a picture parameter set (PPS), an adaptation parameter set (APS), a slice header, and a tile header. In a predetermined block size or less, at least one piece of intra-prediction information may not be signaled. Herein, intra-prediction information of a previously encoded/decoded block (for example, higher block) may be used.

A reference sample for intra-prediction may be configured based on the derived intra-prediction mode. In the description hereinafter, a current block may mean a prediction block or a sub-block having a size/form smaller than a size/form of the prediction block. The reference sample may be configured by using at least one sample reconstructed adjacent to a current block or by using a combination of samples. In addition, filtering may be applied to the configured reference sample.

A number or position or both of reconstructed sample lines used for configuring the reference sample may vary according to a position of a current block within a coding tree block. Each reconstructed sample on a plurality of reconstructed sample lines may be used as a reference sample at it is. Alternatively, a predetermined filter may be applied to the reconstructed sample, and a reference sample may be generated by using the filtered reconstructed sample. Reconstructed samples to which a filter is applied may be included in the same reconstructed sample line or in different reconstructed sample lines.

The configured reference sample may be represented as ref[m, n], and a sample obtained by applying a filter to the configured reference sample may be represented as rec[m, n]. Herein, m or n may be a predetermined integer value representing a position of a sample. When a position of a left upper side sample within the current block is (0, 0), a position of a left upper side reference sample of the current block may be set to (−1, −1).

In order to configure the reference sample, whether or not a neighbor reconstructed sample is available may be determined. When a neighbor reconstructed sample is positioned outside of at least one region of a picture, a slice, a tile, and a CTU, it may be determined as not available. Alternatively, when constrained intra prediction is performed on the current block, the neighbor reconstructed sample may be determined as not available when the neighbor reconstructed sample is positioned at a block that is inter encoded/decoded.

When the neighbor reconstructed sample is determined as non-available, the non-available sample may be replaced by using a neighbor available reconstructed sample. For example, the non-available sample may be replaced by using a neighbor available sample starting from a left lower side sample position. Alternatively, the non-available sample may be replaced by combing available samples. For example, the non-available sample may be replaced by using an average value of available samples which are positioned at both ends of the non-available sample.

Alternatively, non-available samples may be replaced by using information of available reference samples. Herein, the non-available sample may be replaced with an arbitrary value that is not a neighbor available sample value. The arbitrary value may be an average value of available sample values, or a value considering a gradient of available sample values. Alternatively, both of the average value and the gradient may be used. The gradient may be determined based on residual values of neighbor available samples. Alternatively, the gradient may be determined based on the average value and the residual value of the available sample value. Except for the average value, a maximum value, a minimum value, a median value, or a weighted sum using an arbitrary weight may be used. The arbitrary weight may be determined based on a distance between an available sample and a non-available sample.

The above methods may be applied to all upper side and left side reference samples, or may be applied to an arbitrary angle. In addition, when a reference sample line of a current block is configured by using a plurality of reconstructed sample lines, the above method may be applied.

Whether or not to apply filtering to at least one reference sample configured as above may be determined based on at least one of an intra-prediction mode of a current block and a block size/form. When filter is applied, a filtering type may vary according to at least one or an intra-prediction mode, a size, and a form of the current block.

Intra-prediction of the current block may be performed based on the derived intra-prediction mode and the reference sample.

In case of a DC mode, an average value of at least one reference sample among the configured reference sample may be used. Herein, filtering may be applied to at least one prediction sample positioned at a boundary of the current block. A DC prediction may be differently performed depending on at least any one of the size and the shape of a current block. A range of reference samples used in a DC mode may be determined in accordance with the size and/or the shape of a current block.

Figure 7:
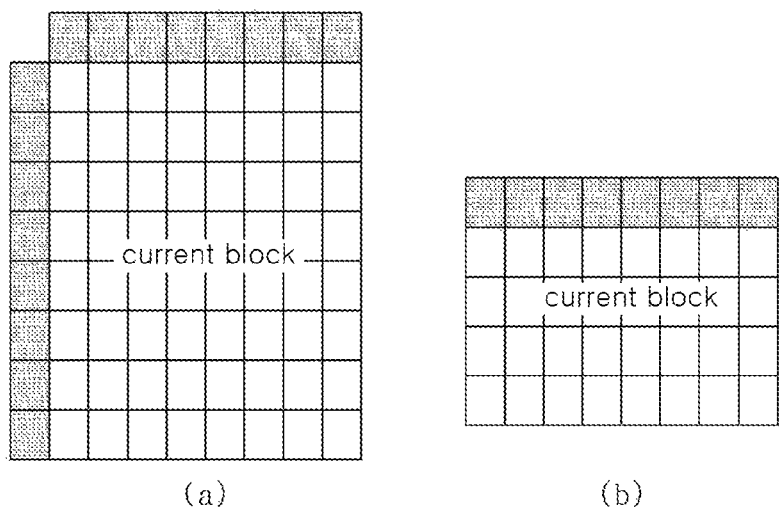
FIG. 7 is a diagram illustrating a DC prediction process performed in accordance with the size and/or the shape of a current block.

FIG. 7 is a diagram illustrating a DC prediction process performed in accordance with the size and/or the shape of a current block.

As illustrated in FIG. 7(a), when the current block has a square shape, a DC prediction may be performed by using an average value of reference samples at an upper side and a left side of the current block.

When the current block has a non-square shape, neighbor samples adjacent to a left boundary or an upper boundary of the current block are selectively used as reference samples for the DC prediction. For example, as illustrated in FIG. 7(b), when the current block has an oblong shape, the DC prediction is performed by using an average value of reference samples adjacent to a longer side boundary (a vertical boundary or a horizontal boundary) of the current block.

When the current block has a predetermined size or has a size within a predetermined size range, some reference samples are selected among reference samples disposed at the upper side or the left side of the current block, and the DC prediction is performed using an average value of the selected reference samples. The predetermined size may refer to a fixed size N×M that is predefined in the encoder or the decoder. N and M are positive integers larger than 0. N and M may be equal to or different from each other. The predetermined size range may refer to a critical value used to select reference samples for the current block. The critical value may be at least any one of a maximum value and a minimum valve. The maximum value and/or the minimum value may be fixed values that are preset in the encoder or the decoder, or variable values encoded and signaled by the encoder.

As described above, an average value of one or more reference samples may be used for the DC prediction. To obtain the average value, a division operation is performed using the number of reference samples. When the number of reference samples is $2^n$ (n is a positive integer), binary shifting is performed instead of the division operation. In the case of a current block having a non-square shape, the number of reference samples may not be $2^n$ when all of the reference samples at the upper side and the left side of the current block are used. In this case, the shifting operation cannot be used instead of the division operation. Accordingly, as described in the present embodiment, it is possible to replace the division operation with the shifting operation by using $2^n$ reference samples disposed at the upper side and the left side of the current block.

In case of a planar mode, a weighted sum considering a distance from the at least one configured reference sample according to a position of a sample being a target of intra-prediction of the current block may be used.

In case of an angular mode, at least one reference sample postioned at a predetermined angle and present adjacent in the position of the intra-prediction target sample may be used.

In case of an intra-prediction mode based on positional information, a reconstructed sample block generated based on encoded/decoded or derived positional information may be used as an intra prediction block of a current block. Alternatively, a decoder may derive by retrieving a reconstructed sample block that will be used as an intra prediction block of a current block.

Intra-prediction of a chroma signal may be performed by using a reconstructed luma signal of a current block. In addition, intra-prediction of other chroma signal Cr may be performed by using a single reconstructed chroma signal Cb of the current block or residual signal of Cb.

Inter-prediction may be performed by combining the at least one above prediction method. For example, an intra prediction block of a current block may be configured by using a weighted sum of a predicted block using a predetermined non-angular intra-prediction mode and a predicted block using a predetermined angular intra-prediction mode. Herein, a weight may be differently applied according to at least one of an intra-prediction mode, a block size, and a sample position. Alternatively, in the case of a chroma block, an intra prediction block for the chroma block can be obtained by using the weighted sum of a prediction block that is predicted based on a predetermined intra prediction mode and a prediction block predicted based on a reconstructed signal of a luma block. In this case, the predetermined intra prediction mode may be any one of the modes that can be used to derive an intra prediction mode of the chroma block. In the case of a chroma block, a determination of whether or not to construct a final prediction block using the weighted sum of two prediction blocks as described above is signaled in a format of encoded information.

In case of an angular mode, the configured reference sample may be re-configured based on an angular prediction mode. For example, when the angular prediction mode is a mode using all of left side and upper side reference samples, a one-dimensional array may be configured for the left side or upper side reference sample. Alternatively, an upper side reference sample may be configured by shifting a left side reference sample, or an upper side reference sample may be configured by using a weighted sum of at least one left side reference sample.

Inter-prediction in angles different from each other may be performed on a predetermined sample group unit of a current block. The predetermined sample group unit may be a block, a sub-block, a line or a singular sample.

Figure 8:
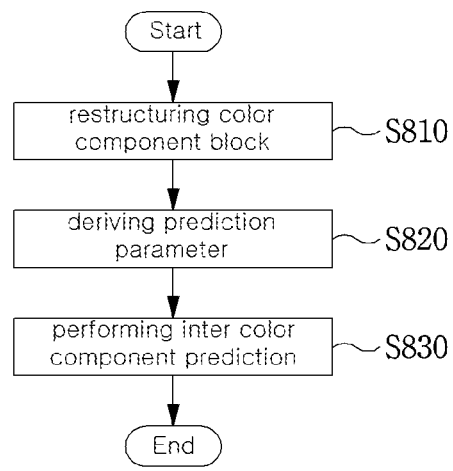
FIG. 8 is a diagram illustrating an inter color component intra prediction process.

According to another embodiment of the present invention, an inter color component intra prediction may be performed. FIG. 8 is a diagram illustrating an inter color component intra prediction process. The inter color component intra prediction includes a color component block restructuring step S810, a prediction parameter deriving step S820, and/or an inter color component prediction execution step S830. The term 'color component' may refer to at least any one of a luma signal, a chroma signal, Red, Green, Blue, Y, Cb, and Cr. A prediction of a first color component can be performed by using at least any one of a second color component, a third color component, and a fourth color component. The signals of the color components used for the prediction may include at least any one of an original signal, a reconstructed signal, a residual signal, and a prediction signal.

When performing an intra prediction for a second color component target block, a sample of a first color component block corresponding block that corresponds to the second color component target block, a sample of a neighbor block of the first color component corresponding block, or both of the samples may be used. For example, when performing an intra prediction for a chroma component block Cb or Cr, a reconstructed luma component block Y corresponding to the chroma component block Cb or Cr may be used. Alternatively, when performing an intra prediction for a chroma component block Cr, a chroma component block Cb may be used. Alternatively, when performing an intra prediction for a fourth color component block, at least one of a first color component block, a second color component block, and a third color component, all of which correspond to the fourth color component block, may be used.

Whether or not to perform an inter color component intra prediction may be determined based on at least any one of the size and the shape of a current target block. For example, when the size of the target block is equal to that of a coding tree unit (CTU), larger than a predetermined size, or within a predetermined size range, the inter color component intra prediction for the target block can be performed. Alternatively, when the shape of the target block is a predetermined shape, the inter color component intra prediction for the target block can be performed. The predetermined shape may be a square shape. In this case, when the target block has an oblong shape, the inter color component intra prediction for the target block may not be performed. Meanwhile, when the predetermined shape is an oblong shape, the embodiment described above inversely operates.

Alternatively, whether or not to perform an inter color component intra prediction for a prediction target block may be determined based on a coding parameter of at least any one block selected from among a corresponding block corresponding to the prediction target block and neighbor blocks of the corresponding block. For example, when the corresponding block has been predicted through an intra prediction method in a constrained intra prediction (CIP) environment, an inter color component intra prediction for the prediction target block may not be performed. Alternatively, when the intra prediction mode of the corresponding block is a predetermined mode, an inter color component intra prediction for the prediction target block can be performed. Further alternatively, whether or not to perform an inter color component intra prediction may be determined on the basis of at least any one of CBF information of the corresponding block and CBF information of the neighbor blocks thereof. The coding parameter is not limited to a prediction mode of a block but various parameters that can be used for encoding/decoding may be used.

The color component block restructuring step S810 will be described below.

Figure 9:
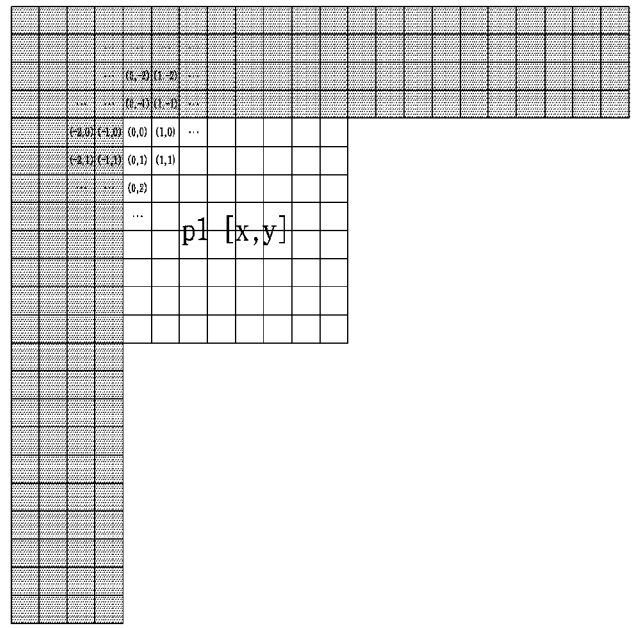
FIG. 9 is an exemplary diagram illustrating a process of restructuring a color component block.
Figure 9:
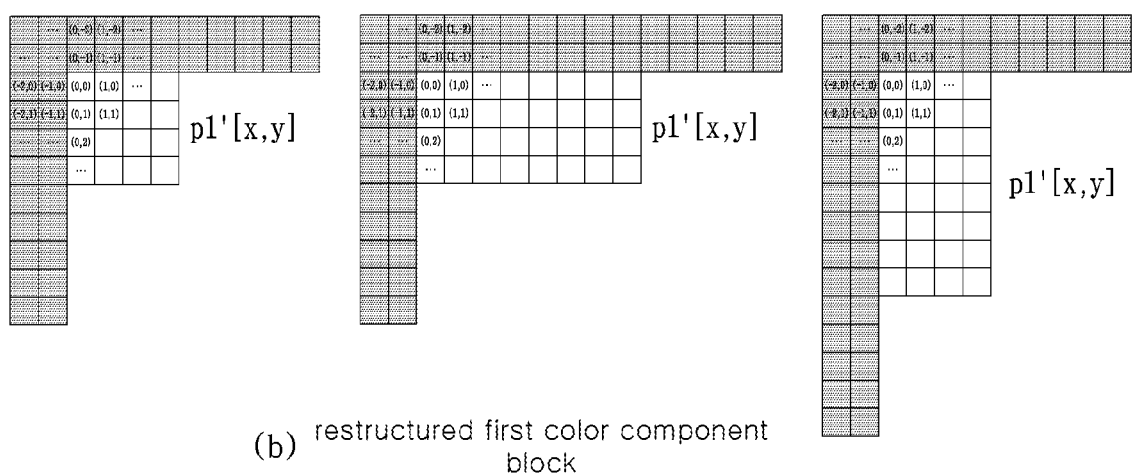

When predicting a second color component block by using a first color component block, the first color component block may be restructured. For example, when an image has an YCbCr color space and when a sampling ratio of color components is one of 4:4:4, 4:2:2, and 4:2:0, the block sizes of color components may differ from each other. Therefore, when predicting a second color component block using a first color component block having a different size from the second color component block, the first color component block may be restructured such that the block sizes of the first color component and the second color component are equalized. The restructured block may include at least any one of a sample in the first color component block that is a corresponding block and a sample in a neighbor block of the first color component block. FIG. 9 is an exemplary diagram illustrating a process of restructuring a color component block.

In FIG. 9(a), p1[x, y] represents a sample at a position (x, y) in the first color component block. In FIG. 9 (b), p1'[x, y] represents a sample at a position (x, y) in the restructured block that is produced by restructuring the first color component block.

When the first color component block has a larger size than the second color component block, the first color component block is down-sampled to have a size equal to that of the second color component block. The down-sampling may be performed by applying an N-tap filter to one or more samples (N is an integer equal to or larger than 1). For the down-sampling, at least any one equation of Equation 1 to Equation 5 may be used. In the case in which any one down-sampling method among various down-sampling methods is selectively used, an encoder may select one down-sampling method as a predetermined down-sampling method. For example, the encoder may select a down-sampling method having optimal effects. The selected down-sampling method is encoded and signaled to a decoder. The signaled information may be index information indicating the down-sampling method.

$$p1'[x,y]=(p1[2x,2y]+p1[2x,2y+1]+1)>>1 \quad \text{[Equation 1]}$$

$$p1'[x,y]=(p1[2x+1,2y]+p1[2x+1,2y+1]+1)>>1 \quad \text{[Equation 2]}$$

$$p1'[x,y]=(p1[2x-1,2y]+2\times p1[2x,2y]+p1[2x+1,2y]+2)>>2 \quad \text{[Equation 3]}$$

$$p1'[x,y]=(p1[2x-1,2y+1]+2p1[2x,2y+1]+p1[2x+1,2y+1]+2)>>2 \quad \text{[Equation 4]}$$

$$p1'[x,y]=(p1[2x-1,2y]+p1[2x,2y]+p1[2x+1,2y]+p1[2x-1,2y+1]+2p1[2x,2y+1]+p1[2x+1,2y+1]+4)>>3 \quad \text{[Equation 5]}$$

The down-sampling method performed with respect to two or more samples is not limited to any one of the examples of Equation 1 to Equation 5. For example, two or more samples used to calculate a down-sampled value p1'[x, y] may be selected from a sample group consisting of a sample p1[2x, 2y] and neighbor samples thereof. The neighbor samples may be ones selected among p1[2x−1, 2y−1], p[2x−1, 2y], p1[2x−1, 2y+1], p1[2x, 2y−1], p1[2x, 2y+1], p1[2x+1, 2y−1], p1[2x+1, 2y], and p1[2x+1, 2y+1]. The down-sampling can be performed by calculating the average or the weighted average of two or more samples.

Alternatively, the down-sampling may be performed in a manner of selecting a specific sample among one or more samples. In this case, at least any one of the following equations, Equation 6 to Equation 9, may be used for the down-sampling.

$$p1'[x,y]=p1[2x,2y] \quad \text{[Equation 6]}$$

$$p1'[x,y]=p1[2x,2y+1] \quad \text{[Equation 7]}$$

$$p1'[x,y]=p1[2x+1,2y] \quad \text{[Equation 8]}$$

$$p1'[x,y]=p1[2x+1,2y+1] \quad \text{[Equation 9]}$$

When the first color component block has a smaller size than the second color component block, the first color component block is up-sampled to be restructured such that the sizes of the first color component block and the second color component block are equalized. In this case, the up-scaling is performed according to Equation 10.

$$p1'[2x,2y]=p1[x,y],$$
$$p1'[2x+1,2y]=(p1[x,y]+p1[x+1,y]+1)>>1,$$
$$p1'[2x,2y+1]=(p1[x,y]+p1[x,y+1]+1)>>1,$$
$$p1'[2x+1,2y+1]=(p1[x+1,y]+p1[x,y+1]+1)>>1 \quad \text{[Equation 10]}$$

In the restructuring process, a filter may be applied to one or more samples. For example, the filter may be applied to one or more samples included in at least any one of the first color component block (i.e. corresponding block), neighbor blocks of the corresponding block, the second color component block (i.e. target block), and neighbor blocks of the target block.

In the reference sample restructuring step described above, an indicator corresponding to a predetermined reference sample line among a plurality of reference sample lines may be signaled. In this case, in the restructuring process, the restructuring is performed using the predetermined reference sample line corresponding to the signaled indicator.

In the restructuring process, when a boundary of the second color component block (target block) or a boundary of the first color component block (corresponding block) is a boundary of a predetermined region, the reference samples used for the restructuring may be differently selected. In this case, the number of reference sample lines at the upper side may differ from the number of reference sample lines at the left side. The predetermined region may be at least any one of a picture, a slice, a tile, a CTU, and a CU.

For example, when the upper boundary of the first color component corresponding block is the boundary of the predetermined region, the reference samples at the upper side may not be used for the restructuring but only the reference samples at the left side may be used for the restructuring. When the left boundary of the first color component corresponding block is the boundary of the predetermined region, the reference samples at the left side may not be used for the restructuring but only the reference samples at the upper side may be used for the restructuring. Alternatively, both of N reference sample lines at the upper side and M reference sample lines at the left side may be used for the restructuring, in which N may be smaller than M. For example, when the upper boundary corresponds to the boundary of the predetermined region, N may be 1. Meanwhile, when the left boundary corresponds to the boundary of the predetermined region, M may be 1.

Alternatively, the restructuring may be performed by using N reference sample lines at the upper side and M reference left sample lines at the left side of the first color component corresponding block, regardless of whether the boundary of the predetermined region is the upper boundary or the left boundary of the first color component block.

Figure 10:
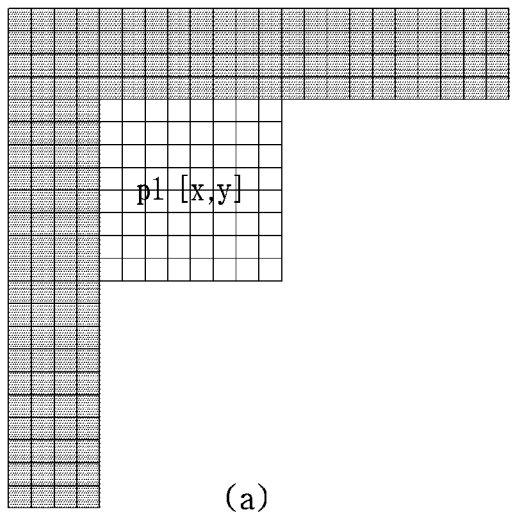
FIG. 10 is a diagram illustrating an embodiment performing restructuring by using a plurality of upper-side reference sample lines and/or a plurality of left-side reference sample lines.
Figure 10:
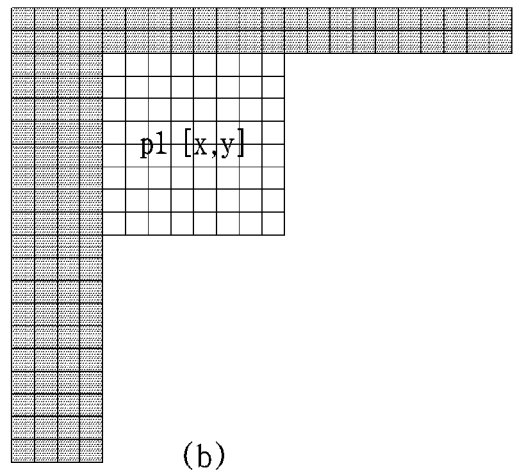
Figure 10:
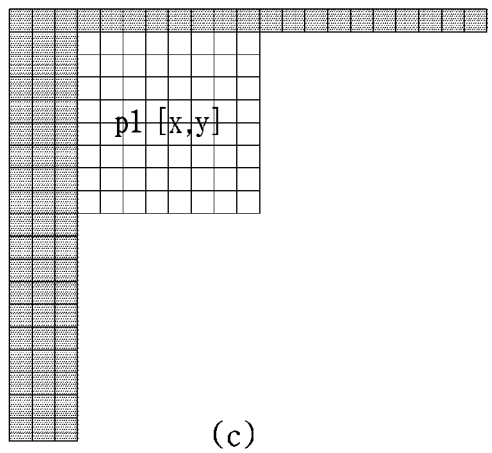
Figure 10:
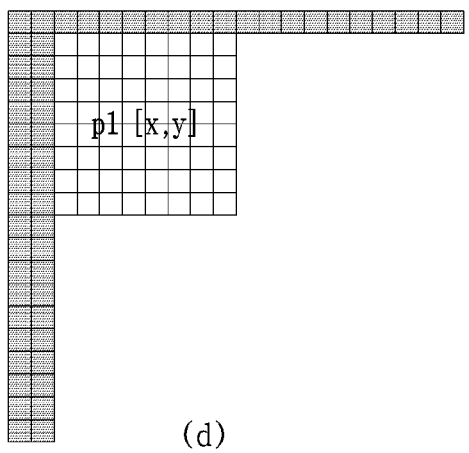
Figure 10:
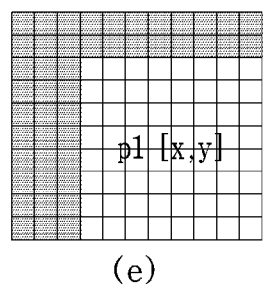

FIG. 10 is a diagram illustrating an embodiment performing restructuring by using a plurality of upper-side reference sample lines and/or a plurality of left-side reference sample lines.

As illustrated in FIG. 10(a), the restructuring may be performed using four upper-side reference sample lines and four left-side reference sample lines.

For example, when the upper boundary or the left boundary of the first color component corresponding block is the boundary of the predetermined region, the number of the upper-side reference sample lines and the number of the left-side reference sample lines used for the restructuring may differ from each other. For example, as illustrated in FIGS. 10(b) to 10(d), any of the following combinations may be used for the restructuring: two upper-side reference sample lines and four left-side reference sample lines; one upper-side reference sample line and three left-side reference sample lines; and one upper-side reference sample line and two left-side reference sample lines.

The number of reference sample lines used for the restructuring is not limited to the above combinations. That is, N upper-side reference samples lines and M left-side reference sample lines may be used in which N and M are equal to or different from each other. When both of the upper boundary and the left boundary of the corresponding block correspond to the boundary of the predetermined region, N and M may be equal to each other. That is, N and M may be both 1. Alternatively, N may be set smaller than M under the same condition. This is because more resources (memory) are required for the upper-side reference sample lines than for the left-side reference sample lines.

Alternatively, as illustrated in FIG. 10(e), one or more reference samples within a region having a vertical length and a horizontal length not larger than those of the first color component corresponding block may be used for the restructuring.

When performing the restructuring process, the reference samples of the first color component corresponding block may be differently set depending on any one of the block size, the block shape, and the coding parameter of at least any one block selected among the first color component corresponding block, neighbor blocks thereof, the second color component target block, and neighbor blocks thereof.

For example, among samples in the first color component corresponding block and the neighbor blocks thereof, samples in blocks whose encoding mode is an inter frame encoding mode are not used but only samples in blocks whose encoding mode is an intra encoding mode are used for the restructuring.

Figure 11:
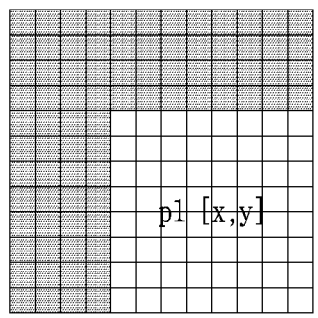
FIG. 11 is an exemplary diagram illustrating reference samples used for the restructuring in accordance with an intra prediction mode or a coding parameter of a corresponding block.
Figure 11:
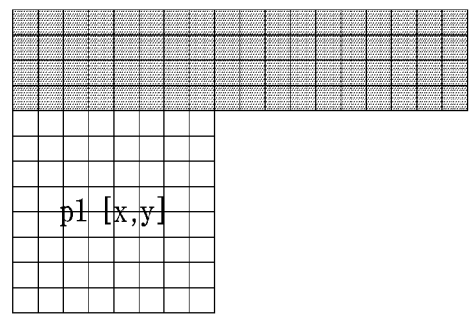
Figure 11:
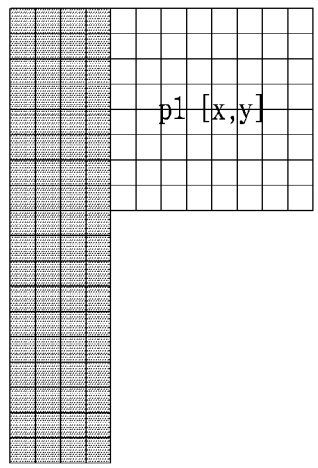
Figure 11:
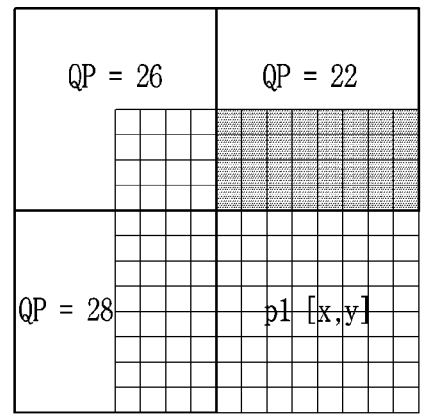

FIG. 11 is an exemplary diagram illustrating reference samples used for the restructuring in accordance with an intra prediction mode or a coding parameter of a corresponding block. The restructuring of the reference samples of the first color component block may be differently performed in accordance with the intra prediction modes of the first color component corresponding block. For example, when the intra prediction mode of the corresponding block is a non-angular mode, such as a DC mode and a planar mode, or an angular mode in which both of the upper-side reference samples and the left-side reference samples are used, as illustrated in FIG. 11(a), at least one sample group of the upper-side reference samples and the left-side reference samples is used for the restructuring. Alternatively, when the intra prediction mode of the corresponding block is an angular mode in which both of the upper-side reference samples and the left-side reference samples of the corresponding block are used, as illustrated in FIG. 11(b), the restructuring of the corresponding block is performed using at least one sample group of the upper-side reference samples and the left-side reference samples. Alternatively, when the intra prediction mode of the corresponding block is an angular mode in which both of the left-side reference samples and the upper-side reference samples are used, as illustrated in FIG. 11(c), the corresponding block may be restructured using at least any one sample group of the left-side reference samples and the lower left-side reference samples.

Alternatively, the reference samples used to restructure the first color component corresponding block are differently selected in accordance with the quantization parameter of at least any one of the first color component corresponding block and the neighbor blocks thereof. For example, as illustrated in FIG. 11(d), reference samples in an upper block that is disposed at the upper side of the corresponding block and whose neighbor blocks have a relatively small quantization parameter value QP are used for the restructuring of the corresponding block.

Alternatively, when the second color component target block has an oblong shape, reference samples disposed around a first color component corresponding block having a square shape are used for the restructuring.

Alternatively, when the second color component target block is partitioned into two sub-blocks (for example, two 16×8-size sub-blocks) and when the first color component corresponding block is a 32×16-size block, reference samples disposed around a 32×32-size block are used for the restructuring of the corresponding block. In this case, as reference samples of the first color component block corresponding to a second 16×8-size sub-block disposed at a lower side among the partitioned two sub-blocks of the second color component corresponding block, reference samples around a restructured 32×32-size block may be shared.

Hereinbelow, the prediction parameter deriving step S820 will be described.

A prediction parameter can be derived using at least any one of reference samples of the restructured first color component corresponding block and reference samples of the second color component prediction target block. Hereinafter, the terms 'first color component' and 'first color component block' may respectively refer to a restructured first color component and a restructured first color component block.

Figure 12:
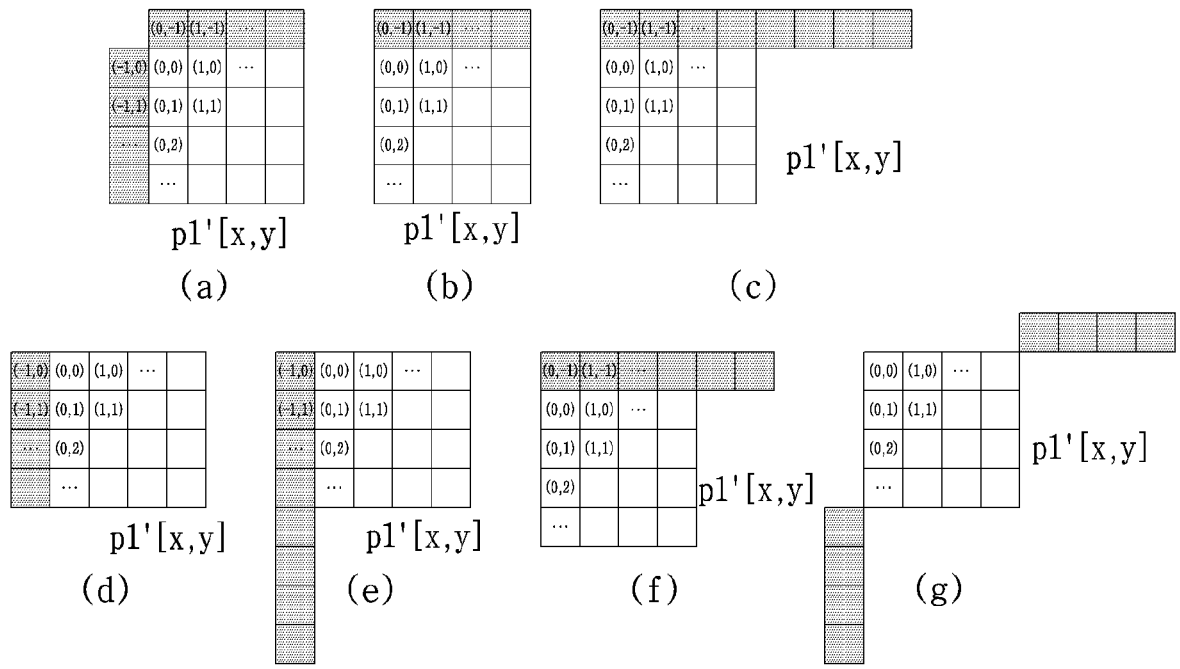
FIG. 12 is a diagram illustrating an exemplary restructured first color component corresponding block when a second color component prediction target block is a 4×4 block.

FIG. 12 is a diagram illustrating an exemplary restructured first color component corresponding block when a second color component prediction target block is a 4×4 block. In this case, the number of reference sample lines may be N.

The prediction parameter may be derived using reference samples disposed at the upper side and the left side of the restructured first color component corresponding block or of the second color component prediction target block as illustrated in the FIG. 12(a).

For example, the prediction parameter can be derived by adaptively using the reference samples of the restructured first color component, on the basis of the intra prediction mode of the first color component corresponding block. In this case, the reference samples of the second color component can be adaptively used on the basis of the intra prediction mode of the first color component corresponding block.

When the intra prediction mode of the first color component corresponding block is a non-angular mode such as a DC mode or a planar mode, or an angular mode in which both of upper-side reference samples and left-side reference samples are used, reference samples at the upper side and the left side of the first color component corresponding block can be used as illustrated in FIG. 12(a).

When the intra prediction mode of the first color component corresponding block is a non-angular mode in which upper-side reference samples are used, reference samples at the upper side of the first color component corresponding block may be used as illustrated in FIG. 12(b) or 12(c).

When the intra prediction mode of the first color component corresponding block is an angular mode in which left side reference samples are used, reference samples at the left side of the first color component corresponding block may be used as illustrated in FIG. 12(d) or 12(e).

Alternatively, when the intra prediction mode of the first color component corresponding block is an angular mode, reference samples used in each prediction mode can be used as reference samples of the first color component. For example, when the intra prediction mode is a vertical mode, reference samples illustrated in FIG. 12(b) may be used. When the intra prediction mode is a horizontal mode, reference samples illustrated in FIG. 12(d) may be used. When the intra prediction mode is an up-right diagonal mode, reference samples illustrated in FIG. 12(c) may be used. When the intra prediction mode is a down-left diagonal mode, reference samples illustrated in FIG. 12(e) may be used. When the intra prediction mode is a mode between the vertical mode and the up-right diagonal mode, reference samples illustrated in FIG. 12(f) may be used. When the intra prediction mode is an angular mode of a 45° diagonal direction, upper right reference samples, lower left reference samples, or both are used as illustrated in FIG. 12(g). Reference samples that are differently selected for each intra prediction mode are stored in a format of a look-up table so as to be conveniently used.

The prediction parameter may be derived by adaptively using the reference samples of the first color component or the second color component in accordance with the size and/or the shape of the first color component block and/or the second color component block.

For example, when the second color component target block has a 64×64 size, 32, 16, or 8 reference samples among reference samples at the upper side or the left side of the first color component block or the second color component block may be used. As described above, when the size of the second color component target block is a predetermined size, the reference samples of the first or second color component block may be adaptively used. The predetermined size is not limited to the 64×64 size, but it may be a size signaled through a bitstream or a size derived on the basis of the coding parameter of a current block or a neighbor block thereof.

Alternatively, when the second color component target block has an oblong shape, reference samples adjacent to a longer side, which is a vertical side or a horizontal side, of the second color component target block may be used. For example, when the target block has a block size of 32×8, reference samples at the upper side of the first color component or the second color component block may be used.

Alternatively, when the second color component target block has an oblong shape, reference samples around a square block can be used. For example, when the target block is a 32×8 block, reference samples around a 32×32 block can be used.

The prediction parameter can be derived using reference samples around the restructured first color component block and reference samples around the second color component block. The prediction parameter can be derived on the basis of any one of the factors including a correlation, a change, an average value, and a distribution of color components. In this case, any one of the methods of Least Squares (LS), Least Mean Squares (LMS), etc. may be used.

When deriving the prediction parameters through the LMS method, the prediction parameters may be a and b, $\alpha$ and $\mu$, or both. Prediction parameters that can minimize an error between the reference samples of the first color component and the reference samples of the second color component can be derived by Equation 11.

$$E(a, b) = \sum_{n=0}^{N-1} (p2_n - (\alpha \cdot p1'_a + b))^2 \quad \text{[Equation 11]}$$

In Equation 11, $p2_n$ represents a reference sample of the second color component, and $p1'_n$ represents a reference sample of the restructured first color component. N is the number of used reference samples arranged in a vertical direction or a horizontal direction, and a and b represent prediction parameters.

In this case, a correlation between the reference samples can be calculated by Equation 12.

$$k = \text{Max}(0,\ BitDepth + \log 2(N) - 15) \quad \text{[Equation 12]}$$

$$L = \left( \sum_{y=0}^{N-1} p1'[-1, y] + \sum_{x=0}^{N-1} p1'[x, -1] \right) \gg k$$

$$C = \left( \sum_{y=0}^{N-1} p2[-1, y] + \sum_{x=0}^{N-1} p2[x, -1] \right) \gg k$$

$$LL = \left( \sum_{y=0}^{N-1} p1'[-1, y]2 + \sum_{x=0}^{N-1} p1'[x, -1]2 \right) \gg k$$

$$LC = \left( \sum_{y=0}^{N-1} p1'[-1, y] \times p2[-1, y] + \sum_{x=0}^{N-1} p1'[x, -1] \times p2[x, -1] \right) \gg k$$

In Equation 12, BitDepth represents a bit depth. p1' represent a sample of the restructured first color component, and p2 represents a sample of the second color component.

Figure 13:
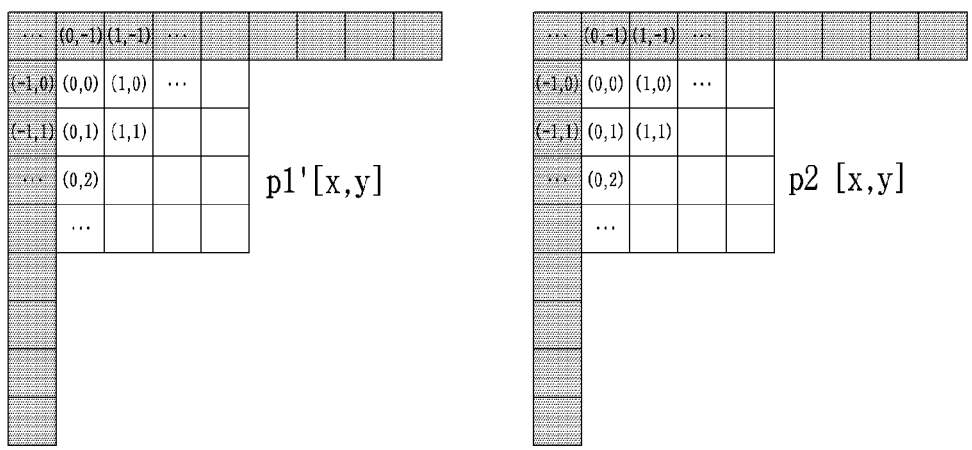
FIG. 13 is a diagram illustrating a sample of a first color component and a sample of a second color component.

FIG. 13 is a diagram illustrating a sample of a first color component and a sample of a second color component.

When there is a region with no reference sample in the process of deriving a prediction parameter, the prediction parameter can be derived using only existing samples.

One or more prediction parameters can be derived. For example, a first prediction parameter may be derived from reference samples having values satisfying a specific requirement among reference samples used to derive prediction parameters. In addition, a second prediction parameter may be derived from referenced samples having values that do not satisfy the specific requirement. The specific requirement may be a condition in which the value of a reference sample is less than a statistic figure (for example, an average value).

According to another embodiment of the present invention, a basic prediction parameter (default parameter) may be used instead of deriving a prediction parameter from values of reference samples. The default parameters may be predefined in the encoder and the decoder. For example, the prediction parameters a and b may be respectively 1 and 0.

Alternatively, when deriving prediction parameters from reference samples, the derived prediction parameters may be encoded and decoded.

When performing an inter color component prediction among color components Y, Cb, and Cr, prediction parameters used to predict color components Cb and Cr can be derived from a color component Y. Prediction parameters used to predict a color component Cr can be derived from a color component Cb. Alternatively, as prediction parameters for predicting a color component Cr, the prediction parameters that have been derived from a color component Y to predict a color component Cb can be used as they are, instead of deriving new prediction parameters for a prediction of the color component Cr.

Hereinbelow, the inter color component prediction execution step S830 will be described.

As described above, after prediction parameters are derived, an inter color component intra prediction can be performed using at least any one of the derived prediction parameters.

For example, a prediction of a second color component target block can be performed by applying the derived prediction parameter to a reconstructed signal of the restructured first color component, according to Equation 13.

$$p2[x,y] = a \times p1'[x,y] + b \qquad \text{[Equation 13]}$$

In Equation 13, p2[x, y] represents a prediction block of the second color component target block. p1'[x, y] represents the first color component block or the restructured first color component block.

Alternatively, the prediction of the second color component target block can be performed by applying the derived prediction parameter to a residual signal of the restructured first color component, according to Equation 14.

$$=p2[x,y] = p2\_pred[x,y] + a \times p1'\_residual[x,y] \qquad \text{[Equation 14]}$$

In Equation 14, p1'_residual represents a residual signal of the first color component and p2_pred represents a prediction signal obtained by performing an intra prediction with respect to the second color component target block.

When the number of the derived prediction parameters is one or more, one or more prediction parameters may be applied to the reconstructed sample of the first color component. For example, when the reconstructed sample of the first color component satisfies a specific requirement, the inter color component intra prediction may be performed by applying the first prediction parameter derived from the reference samples that satisfy the specific requirement. Meanwhile, when the reconstructed sample of the first color component does not satisfy the specific requirement, the inter color component intra prediction may be performed by applying the second prediction parameter derived from the reference samples that do not satisfy the specific requirement. The specific requirement means a condition that the value of a reference sample is less than a statistic figure (for example, an average value) of the reference samples of the first color component.

The inter color component prediction method also can apply to an inter frame prediction mode. For example, when predicting a current block through an inter frame prediction method, an inter frame prediction may be performed with respect to a first color component and an inter color component prediction may be performed with respect to a second color component. In this case, the first color component may be a luma component, and the second color component may be a chroma component. The inter color component prediction can be adaptively performed in accordance with the coding parameter of the first color component. For example, whether or not to perform the inter color component prediction may be determined on the basis of CBF information of the first color component. The CBF information may be information representing presence or absence of a residual signal. That is, when the CBF of the first color component is 1, the inter color component prediction for the second color component may be performed. Meanwhile, when the CBF of the first color component is 0, the inter color component prediction for the second color component is not performed but the inter frame prediction for the second color component is performed. Alternatively, a flag indicating whether or not to perform the inter color component prediction may be signaled.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, an additional identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method, comprising:
    deriving an intra prediction mode of a current luma block;
    selecting one or more reference sample lines from a plurality of reference sample lines based on whether an upper boundary of the current luma block is part of a boundary of a current coding tree block comprising the current luma block;
    deriving a reference sample of intra prediction for the current luma block using the selected one or more reference sample lines; and
    generating a prediction block by performing intra prediction for the current luma block based on the intra prediction mode and the reference sample,
    wherein, in case that a height and a width of the current luma block are different, and the intra prediction mode of the current luma block is a DC mode, the intra prediction of the current luma block by the DC mode is performed by using an average value of reference samples adjacent to a longer side between the width and the height of the current luma block.

2. The method of claim 1, wherein a number of the selected reference sample lines is differently determined based on whether the upper boundary of the current luma block is part of the boundary of the current coding tree block.

3. The method of claim 2, wherein, in case the upper boundary of the current luma block is part of the boundary of the current coding tree block, the number of the selected reference sample lines is 1.

4. The method of claim 1, wherein, in case a number of the reference samples is $2^n$, the average value is obtained by a shift operation of n bits.

5. An image encoding method, comprising:
    determining an intra prediction mode of a current luma block;
    selecting one or more reference sample lines from a plurality of reference sample lines based on whether an upper boundary of the current luma block is part of a boundary of a current coding tree block comprising the current luma block;
    deriving a reference sample of intra prediction for the current luma block using the selected one or more reference sample lines; and
    generating a prediction block by performing intra prediction for the current luma block based on the intra prediction mode and the reference sample,
    wherein, in case that a height and a width of the current luma block are different, and the intra prediction mode of the current luma block is a DC mode, the intra prediction of the current luma block by the DC mode is performed by using an average value of reference samples adjacent to a longer side between the width and the height of the current luma block.

6. The method of claim 5, wherein a number of the selected reference sample lines is differently determined based on whether the upper boundary of the current luma block is part of the boundary of the current coding tree block.

7. The method of claim 6, wherein, in case the upper boundary of the current luma block is part of the boundary of the current coding tree block, the number of the selected reference sample lines is 1.

8. A non-transitory computer-readable recording medium storing a bitstream which is received and decoded by an image decoding apparatus and used to reconstruct an image, wherein the bitstream comprises information on prediction of a current luma block,
the information on prediction of the current block is used to derive an intra prediction mode of the current luma block,
the intra prediction mode of the current luma block is used to generate a prediction block by performing intra prediction for the current luma block,
a reference sample used for the intra prediction is derived using one or more reference sample lines selected from a plurality of reference sample lines based on whether an upper boundary of the current luma block is part of a boundary of a current coding tree block comprising the current luma block,
wherein, in case that a height and a width of the current luma block are different and the intra prediction mode of the current luma block is a DC mode, the intra prediction of the current luma block by the DC mode is performed by using an average value of reference samples adjacent to a longer side between the width and the height of the current luma block.

9. An image decoding method, comprising:
deriving an intra prediction mode of a current chroma block;
selecting one or more luma reference sample lines from a plurality of luma reference sample lines based on whether an upper boundary of a current luma block corresponding to the current chroma block is part of a boundary of a current coding tree luma block comprising the current luma block when the intra prediction mode of the current chroma block is an inter color component prediction mode;
deriving luma reference samples for inter color component prediction using the selected one or more luma reference sample lines;
deriving chroma reference samples for the current chroma block;
determining a correlation parameter based on the luma reference samples and the chroma reference samples; and
generating a prediction block of the current chroma block by performing inter color component prediction based on a reconstructed block of the current luma block and the correlation parameter;
wherein, when the upper boundary of the current luma block is part of the boundary of the current luma coding tree block, only one luma upper reference sample line is selected as a luma reference sample line for the current block.

10. An image encoding method, comprising:
deriving an intra prediction mode of a current chroma block;
selecting one or more luma reference sample lines from a plurality of luma reference sample lines based on whether an upper boundary of a current luma block corresponding to the current chroma block is part of a boundary of a current coding tree luma block comprising the current luma block when the intra prediction mode of the current chroma block is an inter color component prediction mode;
deriving luma reference samples for inter color component prediction using the selected one or more luma reference sample lines;
deriving chroma reference samples for the current chroma block;
determining a correlation parameter based on the luma reference samples and the chroma reference samples; and
generating a prediction block of the current chroma block by performing inter color component prediction based on a reconstructed block of the current luma block and the correlation parameter,
wherein, when the upper boundary of the current luma block is part of the boundary of the current luma coding tree block, only one luma upper reference sample line is selected as a luma reference sample line for the current block.

11. A non-transitory computer-readable recording medium storing a bitstream that is generated by encoding a video based on an image encoding method, the image encoding method comprising:
deriving an intra prediction mode of a current chroma block;
selecting one or more luma reference sample lines from a plurality of luma reference sample lines based on whether an upper boundary of a current luma block corresponding to the current chroma block is part of a boundary of a current coding tree luma block comprising the current luma block when the intra prediction mode of the current chroma block is an inter color component prediction mode;
deriving luma reference samples for inter color component prediction using the selected one or more luma reference sample lines;
deriving chroma reference samples for the current chroma block;
determining a correlation parameter based on the luma reference samples and the chroma reference samples; and
generating a prediction block of the current chroma block by performing inter color component prediction based on a reconstructed block of the current luma block and the correlation parameter,
wherein, when the upper boundary of the current luma block is part of the boundary of the current luma coding tree block, only one luma upper reference sample line is selected as a luma reference sample line for the current block.

* * * * *